US000001175H

United States Statutory Invention Registration [19]

[11] Reg. Number: H1175

Giorgio

[43] Published: Apr. 6, 1993

[54] DYNAMIC CHANNEL SELECTION SYSTEM

[75] Inventor: Paul J. Giorgio, Providence, R.I.

[73] Assignee: The United States of America as represented by the Secretary of the Navy, Washington, D.C.

[21] Appl. No.: 375,078

[22] Filed: Jul. 3, 1989

Related U.S. Application Data

[63] Continuation-in-part of Ser. No. 195,991, May 4, 1988, Pat. No. 4,862,456, and a continuation-in-part of Ser. No. 195,992, May 4, 1988, Pat. No. 4,864,567.

[51] Int. Cl.[5] ..... H04J 3/00

[52] U.S. Cl. ..... 370/118; 370/112; 375/38; 379/98

[58] Field of Search ..... 370/118, 112, 80; 375/38

[56] References Cited

U.S. PATENT DOCUMENTS

| | | | |
|---|---|---|---|
| 4,270,202 | 5/1981 | Stuttard et al. | 370/80 |
| 4,383,316 | 5/1983 | Seidel | 370/118 |
| 4,734,920 | 3/1988 | Betts | 375/38 |
| 4,775,987 | 10/1988 | Miller | 370/118 |
| 4,864,567 | 9/1989 | Giorgio | 370/118 |

*Primary Examiner*—Bernarr E. Gregory

*Attorney, Agent, or Firm*—Michael J. McGowan; Prithvi C. Lall; Michael F. Oglo

[57] ABSTRACT

A dynamic channel selection system interfaces to a plurality of communication paths, senses the number of available paths, and generates a digital word representative of that number. The system, which is adapted to be contained within a modem or similar data communications equipment, transmits this digital word using the first available communication path to a receiving modem or similar equipment. The receiving modem, which contains another channel selection system, senses its number of available communication paths, generates a digital word representative of that number, and subsequently transmits this digital word to the first system. Both systems compare the number of available communication paths at both locations and adjust these numbers so that the maximum number of communication paths can be utilized.

11 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DYNAMIC CHANNEL SELECTION SYSTEM

STATEMENT OF GOVERNMENT INTEREST

The invention described herein may be manufactured and used by or for the Government of the United States of America for governmental purposes without the payment of any royalties thereon or therefor.

This patent application is a continuation-in-part of copending application Ser. No. 07/195,991 entitled "High Speed Modem" now U.S. Pat. No. 4,862,456 and copending application Ser. No. 07/195,992 entitled "High Throughput Data Communication System" now U.S. Pat. No. 4,864,567 with both applications filed on May 4, 1988 by the same inventor as this patent application.

BACKGROUND OF THE INVENTION (1) Field of the Invention

The invention described herein relates to a channel selection system adapted to be contained within a modem or similar data communications equipment for use with business or multiline type telephone stations for sending and receiving data at throughput rates that exceed the rates achieved using conventional or single telephone line modem systems.

All present day data transmission systems, regardless of the protocol or modulation technique used, employ only one telephone line to transmit and receive data. Multiline business type telephone stations utilize a plurality of telephone lines so that if one of the lines is in use, i.e. busy, the next "free" line can be seized. If, for example, two stations each have a three line business telephone system and all three lines from both stations are not in use, then a multiline modem system connected at the originating end operating at 9600 bits per second (bps) on each telephone line could transmit data at the equivalent rate of 28,800 bps. Using the transmission rate cited previously, a 30 Megabyte data file could be transmitted using a multiline modem in 2.5 hours rather than 7 hours at the single line rate of 9600 bps.

(2) Description of the Prior Art

The switched telephone network was designed years ago for the primary purpose of voice or analog transmission between two stations. This network utilizes a "local loop" that connects a subscriber telephone to a central office which supplies the necessary switching, signaling and power equipment. The local loop comprises twisted pair wires that connect the telephone to the central office. This twisted pair wire limits the upper frequency response of the local loop to about 3500 Hz. Transformers at the central office limit the lower frequency response of the local loop to about 300 Hz. This finite bandwidth of approximately 3000 Hz limits the rate of information throughput that the network can process. The present day telephone network utilizes a number of transmission methods to "connect" one subscriber telephone to another. The local loop to the central office is the primary connection from the "originating" telephone to the "answering" telephone. Alternate transmission methods such as microwave links and special toll connecting trunks are used to carry voice information beyond the network capabilities of the central office. Since the local loop to the central office is the only actual physical or "wire" connection, transmission of digital or computer data over telephone lines must be in a form suitable with all elements in the telephone network.

Modems, or Modulators/Demodulators are systems that change the form of digital computer data into a form suitable for transmission over the telephone network. A modem does not operate or alter the content of the computer data; it merely changes the form of the data to be compatible with the telephone network. One of the first methods employed to modulate digital computer data was Frequency Shift Keying (FSK). The first FSK modems were full duplex 300 bits per second (bps) devices that encoded the computer's "ones" and "zeroes" into two distinct frequencies of the originating computer and two other distinct frequencies for the answering computer. This type of encoding allows one bit of information to be encoded per baud where one FSK modem transmits at 300 bps. FSK modems generally cannot exceed 1200 baud because of the telephone network's bandwidth limitations mentioned previously.

Newer methods of encoding digital information for transmission over telephone networks have been devised, most notably differential phase shift keying (DPSK) and quadrature amplitude modulation (QAM). DPSK and QAM modems, unlike FSK modems, can encode more than one bit per baud. Thus a DPSK modem operating at 1200 bits per second which encodes 2 bits per baud is actually transmitting at 600 baud. DPSK modems differ from FSK modems in that the phase of a constant frequency analog signal is varied to encode the data. QAM modems vary the amplitude of the transmitted analog signal as well as its phase. QAM modems typically encode up to 4 bits per baud. A QAM modem operating at 9600 bps which encodes 4 bits per baud would be transmitting digital data at a 2400 baud rate.

Computers generally contain a number of input/output (I/O) ports for communicating with external devices. These I/O ports can be parallel or serial in form. A serial, or asynchronous, I/O port is the connecting interface for external modems. When the computer's serial port outputs digital data, it "frames" the serial data with start and stop bits. A typical serial data stream from the computer would consist of one start bit, eight data bits, and one stop bit. Each data bit can be a binary one or a zero, and start and stop bits are usually fixed as ones or zeroes. A modem connected to the computer's serial output port would convert these ones and zeroes into an FSK, QAM or DPSK form for transmission over the telephone network. At the receiving end of the network, a modem of the same type would accept these modulated signals and convert them into the digital computer ones and zeroes for input into the receiving or answering computer's serial input port. The receiving or answering computer can also output serial data from its serial output port to its modem for transmission over the telephone lines to the originating computer's modem. The originating computer's modem, in addition to transmitting data to the answering computer, can also accept data from the answering computer's modem. This method of simultaneous transmission and reception by both computers using the switched telephone network is known as full duplex communication.

A simple example of a modern day modem's limited throughput capability will illustrate the need for a new and innovative method for transmitting and receiving digital data over conventional telephone lines. A computer with a 30 megabyte (thirty million bytes of information where one byte is equal to eight bits) storage capacity is connected to a modem and the entire contents of the computer's memory will be transmitted at a speed of 9600 bps to a remote computer. If one byte is equal to one character of information, then the total time to transmit 30 M bytes of data would exceed 7 hours. A method of improving data throughput over conventional telephone lines and automatically selecting the number of available channels is needed in order to reduce the data transfer time from one computer to another.

SUMMARY OF THE INVENTION

The Dynamic Channel Selection System described herein is adapted to be contained within a modem or similar telephone communications equipment and connects to a first plurality of telephone lines. This system dynamically senses the number of available (on-hook) telephone lines and produces a digital word representative of that number. This digital word is transmitted through the first available telephone line to a receiving modem which connects to a second plurality of telephone lines. The receiving modem contains another sensing system which determines its number of available telephone lines. The digital representation for the receiving modem's available telephone lines is likewise transmitted to the originating modem.

Each sensing system, the one in the originating modem and the one in the receiving modem, compare their numbers and adjust these numbers so the maximum number of telephone lines available at both the originating and receiving modems are utilized. This maximum number is the smaller of the number of telephone lines available at each of the two modems.

DESCRIPTION OF THE PREFERRED EMBODIMENT

Figure 1:
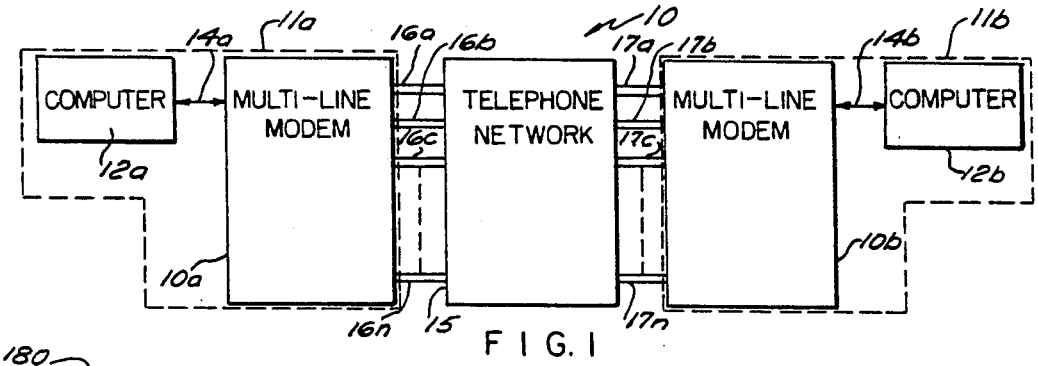
FIG. 1 is a block diagram of the high throughput data communication system in accordance with the present invention.

The multiline modem system described in this disclosure receives and transmits serial data using a computer's serial input/output (I/O) port at a throughput rate that is equal to the modem's data throughput rate times the number of telephone lines available. This high rate serial data is separated by the modem circuitry to a plurality of modem integrated circuits and support circuitry. Each modem alternately modulates and demodulates the outgoing and incoming bytes of data and transmits and receives this separated data over a plurality of telephone lines. If two telephone lines are used and the modem integrated circuit (IC) is operating at 9600 bps, then the computer's serial I/O baud rate would be set to 19,200 baud or 19.2 Kbaud. The serial output data from the computer would enter the modem circuitry at twice the data throughput rate of the modem IC's. Each modem would modulate every other byte of data and send this data over separate telephone lines at 9600 bps. When the originating computer completes transmission of its third byte of data to the modem, the second modem IC is only half way through its transmission cycle of the second byte of data. This third byte is then loaded into the first modem, which has just completed transmitting the first byte of data.

At the answering end of the network, another multiline modem is employed. This modem is referred to as the "answering" modem. The answering modem receives and transmits data over the same number of lines as the originating modem. It receives the first byte of data using its first available telephone line and passes it to internal serial support circuitry that in turn sends it to the answering modem's computer at a rate equal to the transmitting computer (19.2 Kbaud in the example cited). The second byte of data is received using the second available telephone line where the second modem IC demodulates it and passes it to the serial support circuitry. That second byte of data is loaded into the serial circuitry after the first byte has been received and is then sent to the answering modem's computer at the faster (19.2 Kbaud) data rate. The answering modem can also be sending data to the originating modem using the same technique employed by the originating multiline modem system. The originating modem then becomes the answering modem and would employ the same sequence as just described at the answering end of the network of loading its serial support circuitry in the order in which data has arrived.

Different components identified by the same numeral followed by different letters show the components to be identical to each other. The notation of a numeral followed by a-n throughout the specification means that all components carrying the same numeral are identical to each other and the number of components is at the discretion of the designer. All components used are standard off-the-shelf items.

In the present description, a computer will be used for 12*a* and 12*b*. It is to be understood that the term computer used in describing the invention also refers to a Cathode Ray Tube (CRT) Terminal comprised of an internal Central Processing Unit (CPU) with a standard RS-232 I/O port. Other terms can be used to describe computer such as processor, microcontroller, microprocessor, embedded controller, etc.

Referring now to FIG. 1 there is shown a high throughput data communications system 10 having a first station 11*a* comprised of a multiline modem 10*a* connecting to an originating computer 12*a* by means of serial RS-232 input/output port 14*a*. A second station 11*b* has a multiline modem 10*b* connecting to an answering computer 12*b* by means of serial RS-232 input/output port 14*b*. A telephone network 15 having a plurality of telephone lines 16*a–n* and 17*a–n* connects to respective multiline modems 10*a* and 10*b*. Each computer 12*a* and 12*b* contains industry standard software telecommunications programs. Either computer 12*a* or 12*b* can act as the originating computer. Likewise, either computer 12*a* or 12*b* can act as the answering computer. For the purpose of this invention description, computer 12*a* will be considered the originating computer and computer 12*b* will be considered the answering computer. If computer 12*b* is set as an originating device, then computer 12*a* would be set to produce an answer frequency even though it is the originating device. Industry standard command sets usually require that an "R" be placed at the end of the dial command from originating computer 12*a*. Multiline modems 10*a* and 10*b* are both connected to multiline business telephone network 15 that automatically transfers to the next available free telephone line 16*a–n* or 17*a–n* when the telephone network 15 senses a "busy" signal.

Figure 2:
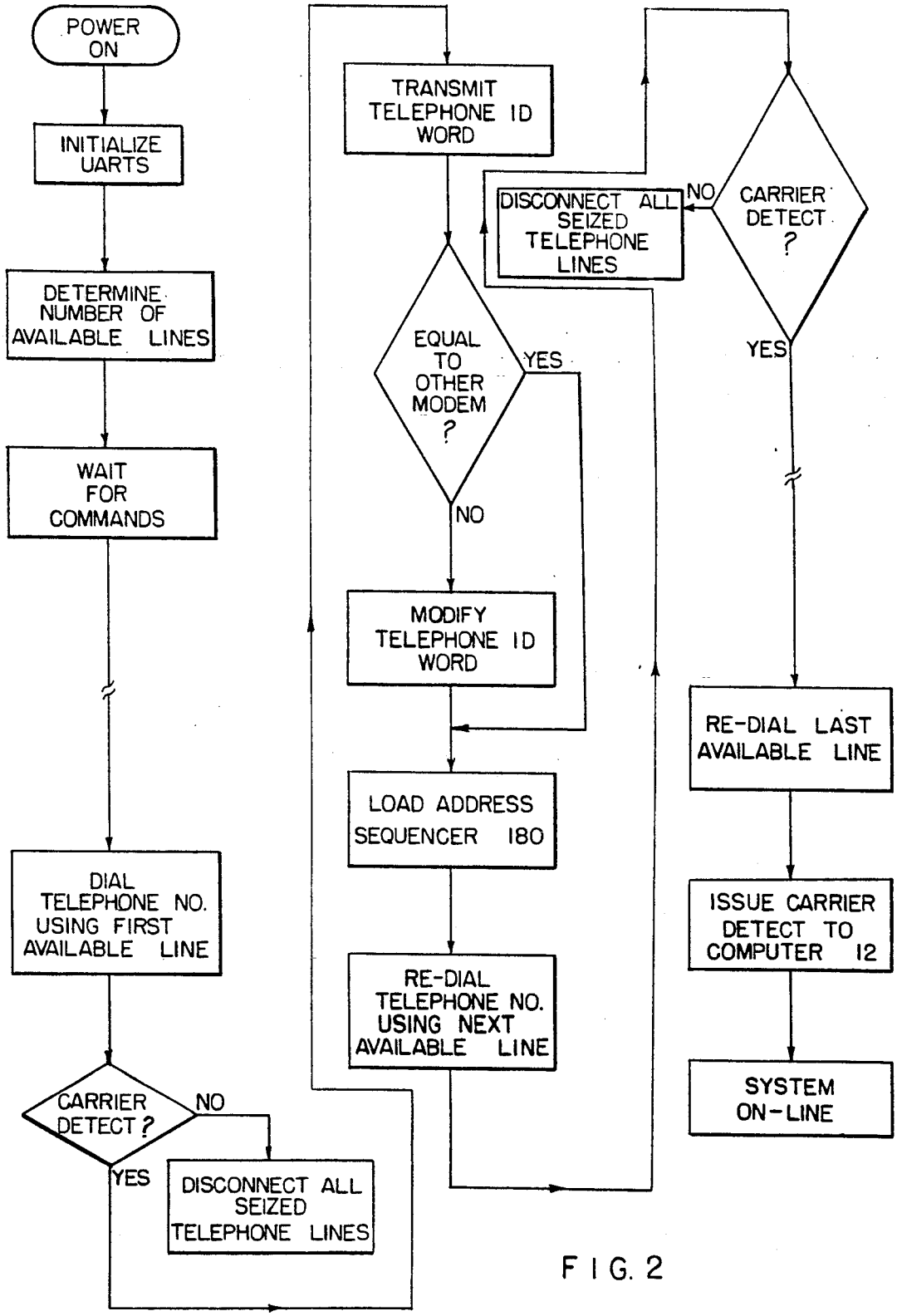
FIG. 2 is a flow chart depicting the initialization and connect sequence of the multiline modem system of FIG. 1.

Refer additionally to FIG. 2 for a flow chart depicting the sequence of operations that transpire during an initialization and connect process. This sequence is stored as a software program in ROM 60 (FIG. 3).

Upon power-up, multiline modem 10*a* initializes all UART's (FIG. 3) and determines the number of available telephone lines. Multiline modem 10*a* will then wait for commands from originating computer 12*a*. The number of available telephone lines is stored and referred to in FIG. 2 as the telephone ID word.

An operator using originating computer 12*a* and industry standard telecommunication commands enters a telephone number to be dialed. Computer 12*a* passes this information over serial I/O port 14*a* to multiline modem 10*a*. Multiline modem 10*a* interprets the dial command from originating computer 12*a* and using telephone line 16*a*, commences dialing. Multiline modem 10*b*, upon receipt of a ring signal on line 17*a* through network 15 "answers" the originating computer's multiline modem 10*a* by issuing a carrier signal. Multiline modem 10*a*, upon receipt of the carrier signal over line 16*a* from answering multiline modem 10*b*, signals to microprocessor 26 (shown in FIG. 3) that a valid carrier signal has been received. This condition places the first available telephone line in an on-line or "connect" state. Originating modem 10*a*, having determined the number of available telephone lines, transmits this information to answering modem 10*b*. Answering modem 10*b*, having determined its number of available telephone lines, transmits this information to originating modem 10*a*. Both modems 10*a* and 10*b* subsequently compare their number of available telephone lines with the number of available telephone lines received from the other modem. If a difference occurs, both modems 10*a* and 10*b* modify their digital representation of the number of telephone lines so that the originating and answering modems utilize the maximum number of telephone lines available at both stations. It is not necessary that both modems 10*a* and 10*b* utilize the same lines, only the same number of lines. Business or multiline telephone systems automatically transfer to the next available telephone line when a busy signal is encountered. Modem 10*a* can, for example, use lines 16*a* and 16*c* of a three line business telephone system if these are the only free lines. Modem 10*b*, on the other hand, would connect to modem 10*a* using lines 17*a* and 17*b* of a six line business telephone system if all of its six lines are free. As long as both modems 10*a* and 10*b* use the same number of telephone lines, the system will operate error free.

This modified number is then loaded into address sequencer 180 (FIG. 3) and selects which lines are used to establish connection during a redial sequence of originating modem 10*a*. Numeric display 200 (FIG. 3) indicates the number of lines utilized.

Once the number of available telephone lines has been established, multiline modem 10*a* then internally issues a redial command and begins redialing the same telephone number using the next available telephone line: 16*c* for this example. (16*c* is shown only in FIG. 1. To depict 16*c* in the other FIGS. would have made the drawings unnecessarily cumbersome). Since answering multiline modem 10*b* is connected to a business telephone network 15, a "busy" signal is not issued from the telephone network 15. Rather, the telephone network 15, upon sensing that receiving or answering line 17*a* is in use, automatically issues a ring signal on line 17*b* to answering multiline line modem 10*b*. Multiline modem 10*b*, upon receipt of a ring signal on line 17*b* "answers" the originating computer's multiline modem 10*a* by issuing another carrier signal on line 17*b*. Multiline modem 10*a* receives this carrier signal over line 16*c* from answering multiline modem 10*b* and signals to microprocessor 26 (FIG. 3) that another valid carrier signal has been receiver. This process continues until all available telephone lines have been successfully seized and connected. When the last line in the system has been connected, a carrier detect signal is sent to the originating computer 12*a* over serial I/O port 14*a*. The operator at originating computer 12*a* is now "on-line" and can commence communication with the answering computer 12*b*.

Figure 3A:
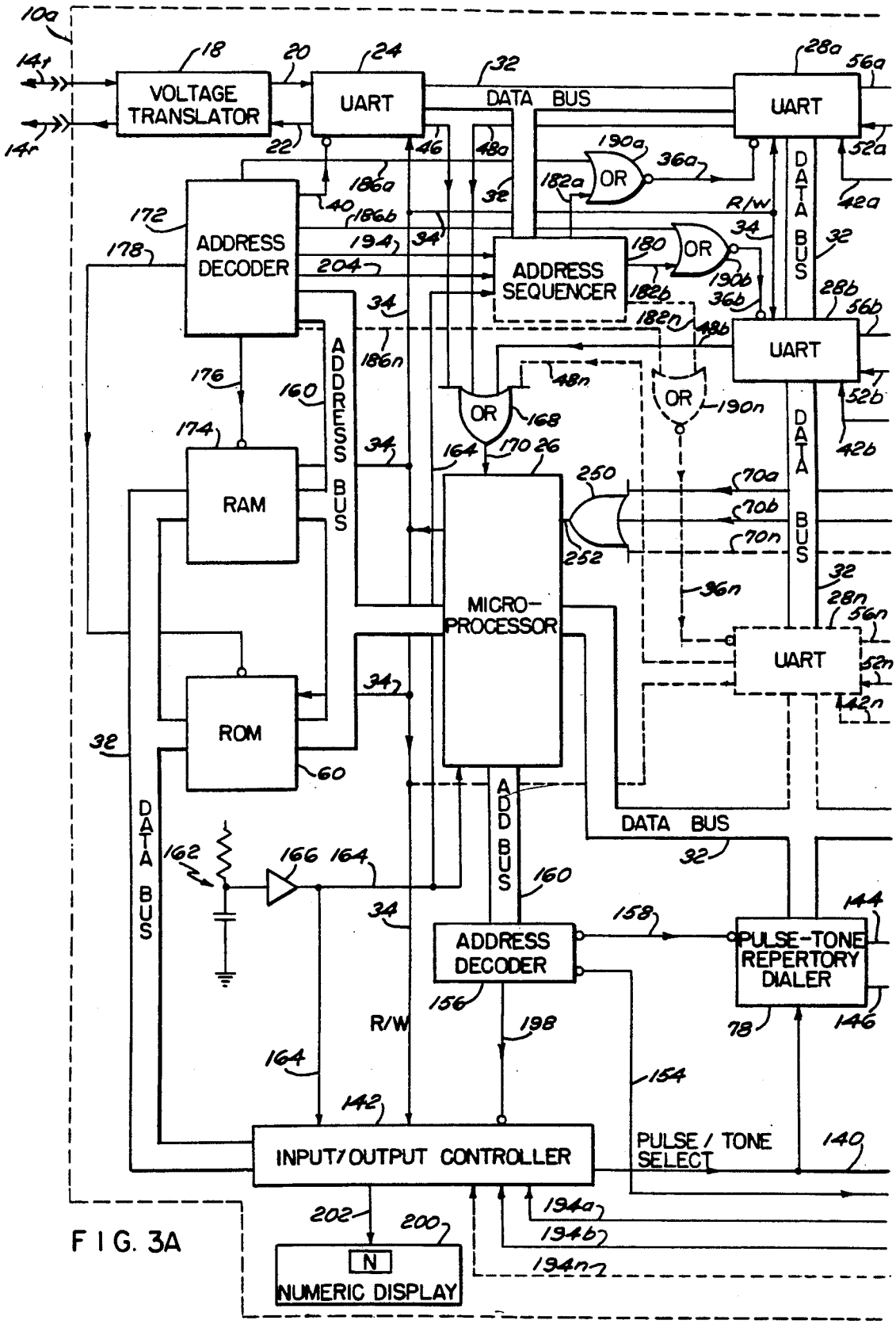
FIGS. 3A and 3B together form a schematic-block diagram detailing the components within a multiline modem of FIG. 1.
Figure 3B:
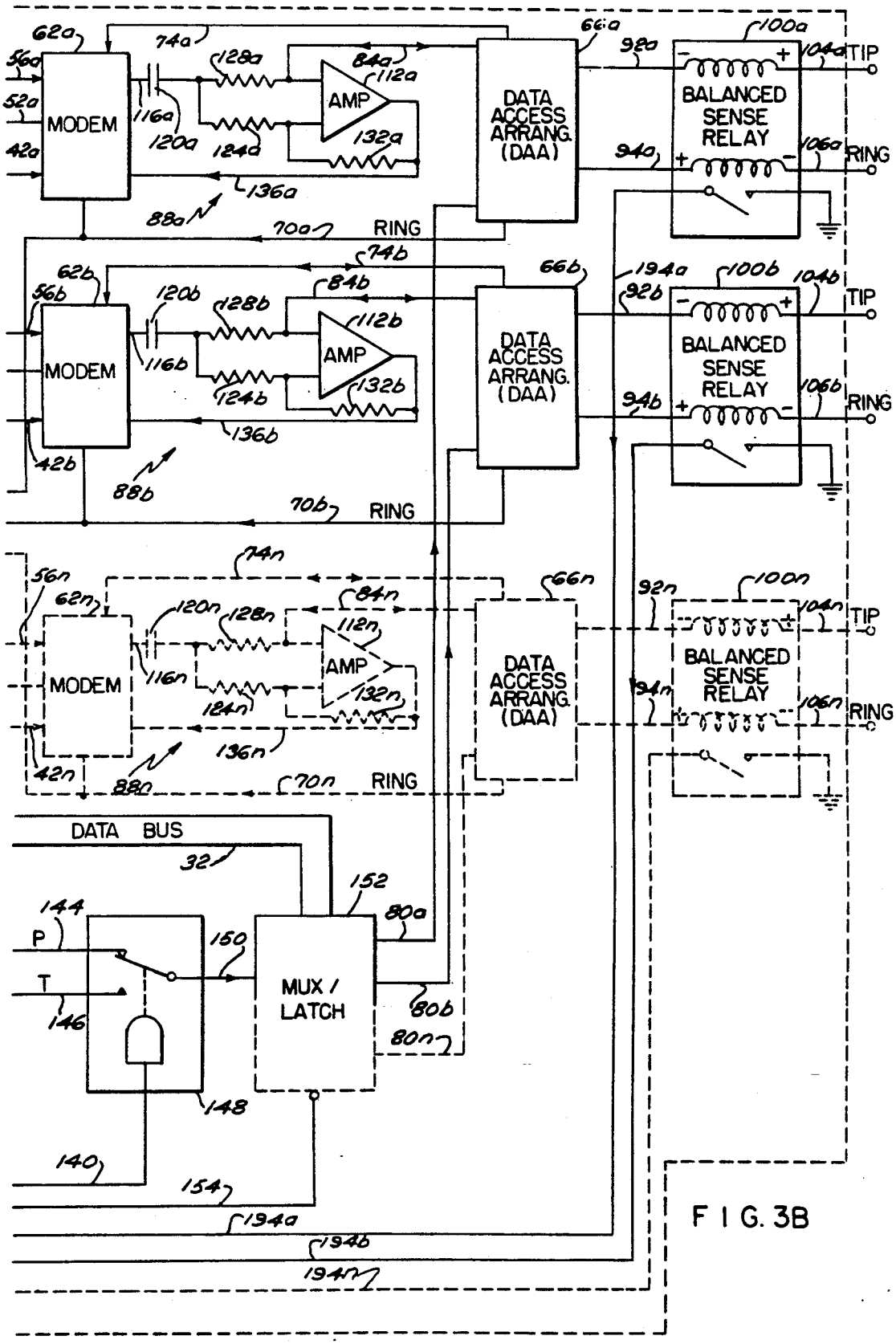

Refer additionally now to FIGS. 3A and 3B for a more detailed explanation of the present invention. FIG. 3 is a block diagram of multiline modem 10*a* shown in FIG. 1. All components described are standard shelf items widely available to the public. It is to be understood that 10*b* operates in a similar fashion.

Multiline modem 10*a* is connected to a business multiline telephone network 15 at the originating end. Another multiline modem 10*b* is connected to the business multiline telephone network 15 at the answering end. An operational description of the originating multiline modem 10*a* will be given. The answering modem 10*b* communicates with originating multiline modem 10*a*, and signals received from and sent to 10*b* will be referred to throughout this description.

The originating computer 12*a* is connected to multiline modem 10*a* by means of serial I/O port 14*a* using serial transmit line 14*t* and serial receive line 14*r*. A voltage translator 18 translates RS-232 transmit signal level voltages on line 14*t* to standard logic level voltages compatible with commercially available integrated circuits used in multiline modem system 10*a*. Voltage translator 18 also translates signal levels from multiline modem 10*a* to RS-232 levels to be compatible with input (receive) port line 14*r*. Voltage translator 18 connects to a Universal Asynchronous Receiver Transmitter (UART) 24 by mean of lines 20 and 22. Line 20 sends data from translator 18 to UART 24 and is the receive line for UART 24. Line 22 sends data from UART 24 to voltage translator 18 and is the transmit line for UART 24. UART 24 provides the data formatting and control to interface serial asynchronous data communications from serial I/O ports to bus organized systems such as microprocessor 26.

UART 24 and 28*a–n* contain internal status and control registers as well as a transmit data register and a receive data register. The control registers are loaded with initialization parameters upon system power up to control the receiver, transmitter, interrupt processing and modem required handshaking signals. The status register within each of UART'S 24 and 28*a–n* provides information to system microprocessor 26 concerning the condition of the internal transmit, receive, peripheral and error detecting circuits. Information concerning each status register is available to microprocessor 26 by reading the contents of the status register.

Information stored in each status register indicates the status of the transmit data register, the receive data register, carrier detect information, framing errors, clear to send information, receiver overrun, parity errors and interrupt request status. These parameters are checked whenever UART's 28*a–n* are read by microprocessor 26. Status flags, such as interrupt request condition, are reset whenever microprocessor 26 reads the status register. The receive data register bit is also cleared in the status register whenever microprocessor 26 reads the receive data register. The transmit data register empty bit in the status register, when set, indicates that the transmit data register contents have been transferred and that new data may be entered.

UART's 24 and 28*a–n* also contain a number of interface lines and handshaking signals. These lines form part of the bi-directional data bus 32, read/write line 34, chip and register select lines 40 and 36*a–n*, clear to send, request to send, carrier detect lines 42*a–n* and interrupt request lines 46 and 48*a–n*. Lines are provided for receive data 52*a–n* (line 20 for UART 24) and transmit data 56*a–n* (line 22 for UART 24). Whenever one of the UART's 24, 28*a–n* receives serial data over its receive data line, its receive data register is loaded with this data. Once full, the receive data register signals to microprocessor 26 through the UART's 24, 28*a–n* interrupt request line 46, 48*a–n* that a byte of data is available in the receive data register. The interrupt status bit in the status register is also set whenever the interrupt request line 46, 48*a–n* is actuated. Microprocessor 26 will acknowledge this interrupt request and first read the contents of the UART's 24, 28*a–n* status register to insure that carrier detect and other status conditions are present and that the receive data register full bit is set. (UART 24 does not connect to a modem. Hence, its request to send and clear to send lines are tied together. Additionally, microprocessor 26 does not check UART 24 for a carrier detect output). Once this has been verified, microprocessor 26 reads the contents of the receive data register and transfers this byte of information to a location determined by the program stored in ROM 60. Reading the receive data register clears the interrupt and receive full status bits in the UART's 24, 28*a–n* status register. UART's 28*a–n* automatically generate an interrupt request if the carrier detect control lines from one or all of modems 62*a–n* signal a loss of carrier detect.

Upon power-up, resistor/capacitor network 162 produces a reset voltage pulse on line 164 buffered by gate 166 and fed to microprocessor 26 and Input/Output (I/O) controller 142. This reset pulse on line 164 resets microprocessor 26 and I/O controller 142. Microprocessor 26 then points to a reset vector address in Read Only Memory (ROM) 60 which produces the address of the first instruction of the power-up routine. This routine begins sequencing through a series of instructions that initialize UART's 24 and 28*a–n*. The UART 24, 28*a–n* control registers are set to disable respective interrupt lines 46 and 48*a–n* from signalling microprocessor 26 whenever any one of the UART's 24, 28*a–n* transmits serial data. The control registers are further initialized so that interrupt lines 46 and 48*a–n* are enabled and will interrupt microprocessor 26 whenever any of the UART's 24, 28*a–n* receives serial data. Enabling interrupt lines 46 and 48*a–n* to respond to incoming (i.e. receive) data only permits multiline modem system 10*a* to respond quickly to incoming serial data. All interrupt lines are logically ORed using multiline input OR gate 168. An output is sent on line 170 from OR gate 168 to microprocessor 26 which responds to this interrupt line according to the interrupt sequence shown in FIG. 4 and stored in Read Only Memory (ROM) 60.

Commands sent from originating computer 12*a* (FIG. 1) are interpreted by microprocessor 26 using routines contained in ROM 60. Industry standard "AT" type commands are supported allowing multiline modem system 10*a* to work with a variety of commercially available packages. Address decoders 172 and 156 decode the logical state of address bus 160 continuously and enable or disable sections of circuitry in modem 10 to work with three state data bus 32. Components within modem 10*a* are memory mapped to respond to the logical state of various address decoders pre-programmed in ROM 60. Random Access Memory (RAM) 174 is used to provide temporary storage of operator initiated parameters, such as the number dialed, the number of telephone lines available, and whether pulse or tone dialing will be used. Select line 176 from address decoder 172 is used to enable RAM 174. Select line 178 from address decoder 172 is used to enable ROM 60.

Modems 62*a–n* are commercially available integrated circuit (IC) modems that contain the necessary handshaking signals and input/output ports to interface with standard UART's and data access arrangements. UART's 28*a–n* connect to respective modems 62*a–n* by means of transmit lines 56*a–n* and receive lines 52*a–n*. Control lines 42*a–n* represent the standard modem to UART handshake lines such as carrier detect, clear to send and request to send. Some commercial modem IC's may utilize other control lines such as data terminal ready and data set ready. The process of selecting modem data over a plurality of telephone lines described in this invention disclosure can, however, be accomplished with any commercial modem IC. Most modem IC's are not designed to mate with a specific microprocessor/microcontroller and interface timing and control signals can easily be adapted regardless of the specific integrated circuit used.

Data Access Arrangements (DAA) 66*a–n* are commercially available communications components that provide a direct connect telephone line interface. They are certified to meet hazardous voltage, surge, and leakage current requirements and meet FCC standards. These DAA's are generally used as the direct connect telephone line interface for most applications in which voice or data is to be transmitted and received over the public switched telephone network. DAA's contain ring detect signals 70*a–n* and modem control signals 74*a–n* such as answer phone, automatic/manual dial and carrier detect. DAA's 6*a–n* also contain input lines 80*a–n* for pulse or tone dialing connection to hybrid duplexers 88*a–n*. Lines 92*a–n* and 94*a–n* are the DAA lines for connection to the telephone tip and ring lines. These lines connect to balanced sense relays 100*a–n* which in turn connect to respective tip lines 104*a–n* and respective ring lines 106*a–n* of respective lines 16*a–n*.

Operational amplifiers 112*a–n* are wired as hybrid duplexers and provide the interface between DAA's 66*a–n* and modem IC's 62*a–n*. Because the telephone system is a two wire, full duplex system, transmit and receive signals can interfere with one another. A duplexer is needed to cancel the transmitted signal, leaving the modem to receive incoming line signals only. The duplexer eliminates the transmit signal from the receiver signal by taking advantage of the differential amplification characteristics of an operational amplifier.

The modem's transmit signal is sent over lines 116*a–n* through capacitors 120*a–n* to resistors 124*a–n* which are connected to the inverting inputs of operational amplifiers 112*a–n*. This signal is also fed to 600 ohm resistors 128*a–n* which connect to the non-inverting input of the amplifiers. Since the telephone line represents a 600 ohm impedance, the transmitted signal is divided by two at the non-inverting input. The signal present at the non-inverting input to the operational amplifiers is the combination of this half amplitude transmit voltage plus the incoming receive voltage from telephone lines 16*a–n* through respective line sense relays 100*a–n*, DAA's 66*a–n*, and DAA bi-directional signal lines 84*a–n*. This total combined signal, the half transmit signal plus the receive signal, is fed into the non-inverting gain input of the operational amplifiers which multiplies the total by two. The transmit signal is also inverted and subtracted from this total by the respective combination of resistors 132*a–n*/124*a–n*, which form an inverting amplifier configuration. The result is a receive signal over lines 136*a–n* into modem IC's 62*a–n* which is twice the amplitude of the incoming receive signal over telephone lines 16*a–n*.

Pulse/tone repertory dialer 78 is a monolithic IC that responds to commands from microprocessor 26. Pulse/-tone dialer 78, when issued a telephone number from microprocessor 26, outputs either standard dual tone multi-frequency (DTMF) or pulse type signals. Once the telephone number is "dialed", microprocessor 26 need only issue a re-dial command to pulse/tone dialer 78 in order to re-dial the same number. Pulse/tone select line 140 is an output signal issued from I/O controller 142 during the command mode to select either pulse or tone dialing. Output lines 144 and 146 from pulse/-tone dialer 78 output pulse or DTMF signals. Analog switch 148 selects pulse or tone dial outputs 144 or 146 by means of pulse/tone select line 140. The output 150 of analog switch 148 is fed to multiplexer/latch 152. Multiplexer/latch 152 is logically enabled via address decode line 154 from address decoder 156. Once enabled, multiplexer/latch 152 connects one of its output lines 80*a–n* to output line 150 of analog switch 148. The selection of lines 80*a–n* is done under microprocessor 26 control using data bus 32. Once the system has connected using the first available telephone line, both modems 10*a* and 10*b* pass information to each other indicating the number of available lines. Both modems 10*a* and 10*b* modify their digital representations so that the maximum number of available telephone lines are used. Microprocessor 26 then issues a re-dial command and energizes the proper select line on multiplexer/-latch 152. Address decoder 156 also contains select line 158 which enables pulse/tone repertory dialer 78. Output lines 154 and 158 of address decoder 156 respond to the logical state of address bus 160 from microprocessor 26. Since data on data bus 32 is present for only a few microseconds, multiplexer/latch 152 incorporates a latching or holding circuit in order to stabilize output lines 80*a–n*.

Figure 4:
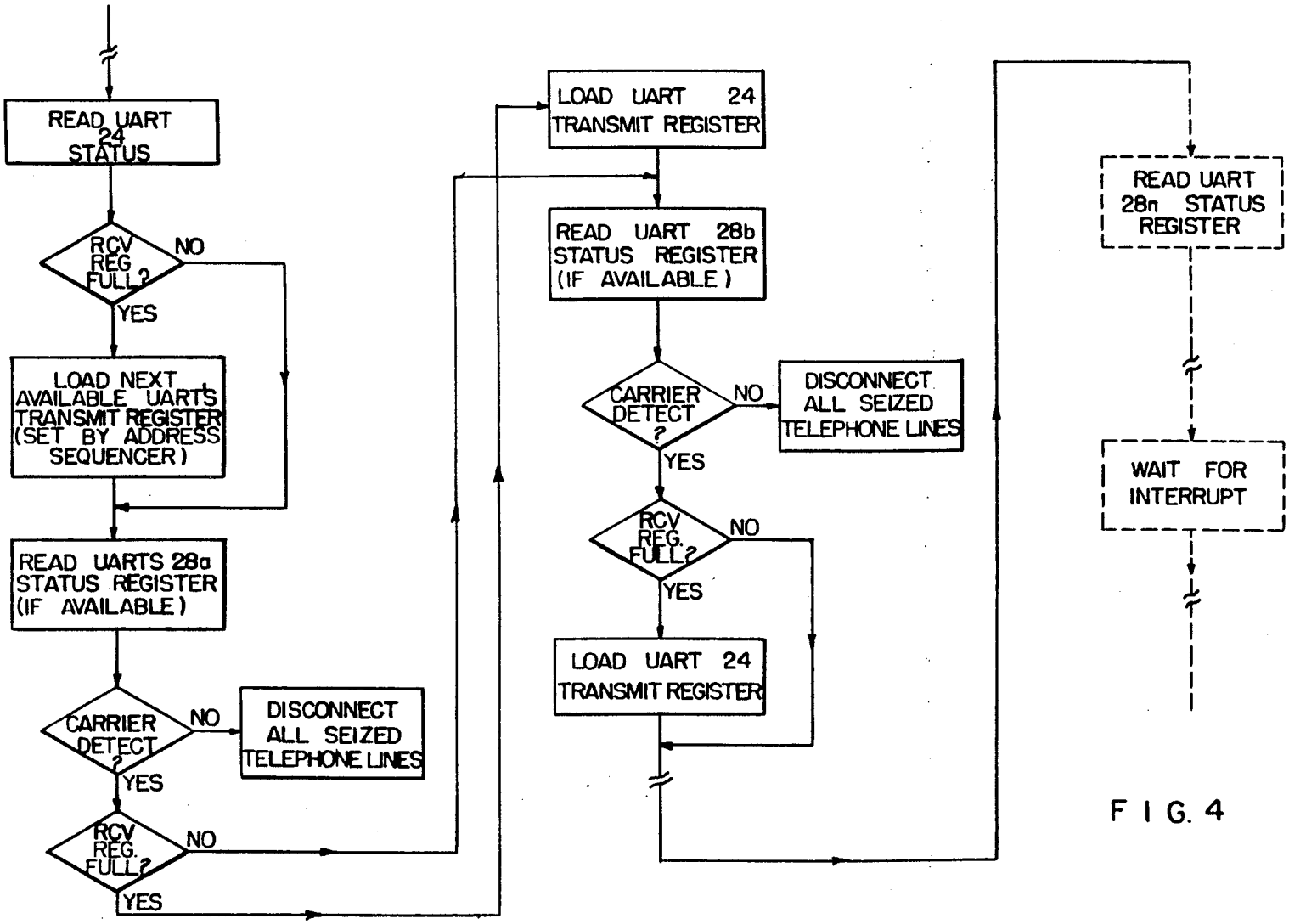
FIGS. 4 is a flow chart depicting the on-line operational sequence of the multiline modem system of FIG. 1.

Refer now additionally to FIG. 4 which is a flow chart depicting the on-line operational sequence of the multiline modem 10*a*. This sequence is stored as a software program in ROM 60.

Serial data from originating computer 12*a* (FIG. 1) is sent over line 14*t* and is received over line 20 to UART 24 through voltage translator 18. UART 24, having received data, signals through interrupt line 46, OR gate 168 and OR gate output line 170 to microprocessor 26 that its receive data register is full.

Microprocessor 26 first checks the status of UART 24 by reading the contents of its status register. Microprocessor 26 then reads UART 24 receive data register by means of address decoder 172, data bus 32, and read/write (R/W) line 34. If receive data is present, microprocessor 26 transfers the contents of UART's 24 receive register to the first available UART 28*a–n* (UART 28*a* if available). If data is present in UART 24's receive data register, that data is transferred to the first available UART in the UART 28*a–n* configuration set by the telephone ID word and address sequencer 180. Microprocessor 26 next checks the status register of the first available UART 28*a–n*. If a carrier detect is noted, microprocessor 26 checks that UART's (one of UART 28*a–n*) receive data register. If the register is full, its contents are transferred to UART 24 transmit register. (A full condition in any one of UART's 28*a–n* indicates that the answering modem 10*b* has transmitted data to originating modem 10*a*). This data is now transmitted by UART 24 over line 22 through voltage translator 18 to receive line 14*r* of originating computer 12*a*. This process continues until all available UART's 28*a–n* are read and their data transferred to UART 24 transmit register. The operational sequence ceases when all available UART's 28*a–n* are checked. In the event of another interrupt signal over line 170 to microprocessor 26, the sequence begins again and UART 24 is 21 checked again, followed by all available UART's 28*a–n*. If UART 24 contains data, its receive data register is full and the contents of that data register are transferred to the next available UART in the UART 28*a–n* configuration set by the telephone ID word in address sequencer 180. The sequence continues by checking all available UART's 28a–n and transferring any data in those UART's 28*a–n* to UART 24.

Whenever a UART 24, 28*a–n* is read by microprocessor 26, the UART's 24, 28*a–n* receive register is cleared and ready to accept another byte of data. The status register is also cleared thereby resetting the interrupt request bit and the receive data full bit.

The alternate transfer or writing from UART 24 to UART's 28*a–n* is accomplished internal to multiline modem 10*a* by means of address sequencer 180. Address sequencer 180 alternately enables UART's 28*a–n* by setting enable lines 182*a–n* to the proper logic state. Address decoder 172, upon receiving a write or load command from microprocessor 26, changes the output state of address sequencer 180 so that UART's 28*a–n* are alternately loaded with incoming data from UART 24. This process of alternate writing or loading to UART's 28*a–n* is accomplished transparent to the PC telecommunications software program running in originating computer 12*a*. This alternate write sequence to UART's 28*a–n* results in UART's 28*a* handling the first incoming byte of data from UART 24, UART 28*b* handling the second byte, UART 28*n* handling the nth byte and UART 28*a* handling the nth +1 byte of data, etc. When these bytes of data are modulated by modems 62*a–n*, answering modem 10*b* (FIG. 1) receives byte number one first over telephone line 17*a*, byte number two over telephone line 17*b*, byte number n over telephone line 17*n*, etc. This sequence continues until the file transfer is complete. This alternate writing to UART's is dependent on the number of available telephone lines 16*a–n*. If any one of the telephone lines 16*a–n* is unavailable (i.e. off-hook), address sequencer 180 must skip the UART's associated with the unavailable telephone lines 16*a–n*. The following paragraphs describe how the address sequencer 180 accomplishes this selective type of loading or writing.

Address sequencer 180 is a combination of off-the-shelf integrated circuits combined to form a state machine that alternately writes or loads only those UART's 28*a–n* connected to available telephone lines 16*a–n*. The selection and writing to available telephone lines 16*a–n* is performed by identifying which telephone lines 16*a–n* are in the on-hook condition and modifying that identification to represent the maximum number of available lines at both the originating and answering stations. The process of alternately writing or loading these UART's 28*a–n* connected to available telephone lines 16*a–n* could be executed using microprocessor 26 and modifying the software program in ROM 60. This method is not as efficient, however, as a dedicated state machine such as address sequencer 180.

The number of available telephone lines 16*a–n* (on-hook) is read using the I/O controller 142. Output lines 194*a–n* from respective line sense relays 100*a–n* provide a logic level HIGH for an on-hook (available) line, and a logic level LOW for an off-hook (unavailable) line. If microprocessor 26 is an eight bit processor then I/O controller 142, when reading lines 194*a–n*, will provide to microprocessor 26 an eight bit ID word that indicates which telephone lines are available and which ones are unavailable. If originating modem 10*a* is connected to an eight line business type telephone and if lines 16*a* and 16*c* are the only lines available, then I/O controller 142 will send the eight bit word "00000101" to microprocessor 26.

Microprocessor 26, having identified the on-hook telephone lines and once on-line (i.e., connected to answering computer 12*b*) uses internal microcoded commands to signal to answering computer 12*b* using modem 62*a*, hybrid duplexer 88*a*, DAA 66*a*, line sense relay 100*a*, and telephone line 16*a* its number of available (on-hook) telephone lines. Answering modem 10*b* checks this number with the number of available lines that it has, and if a match occurs, the ID words are not modified. The initial carrier detect from answering modem 10*b* has been held in abeyance by means of microprocessor 26 in originating modem 10*a*, and the originating computer 12*a* will not receive a "connect" signal. When all available lines are internally connected by means of microprocessor 26 issuing radial commands, a carrier detect signal is sent to originating computer 12*a* and the operator of this computer receives an "on-line" or "connect" indication on his/her computer CRT.

In the event that a match does not occur, both modems 10*a* and 10*b* (originating and answering) revert to the maximum number of available telephone lines at both stations. A visual indication displaying the number of available lines is shown using numeric display 200 driven by I/O controller 142 through line 202 on both the originating and answering computers. I/O controller 142 is enabled from select line 198 from address decoder 156. Once the number of available lines has been identified, both the answering and originating computer's operators can set their serial I/O ports to the correct baud rate.

Figure 5:
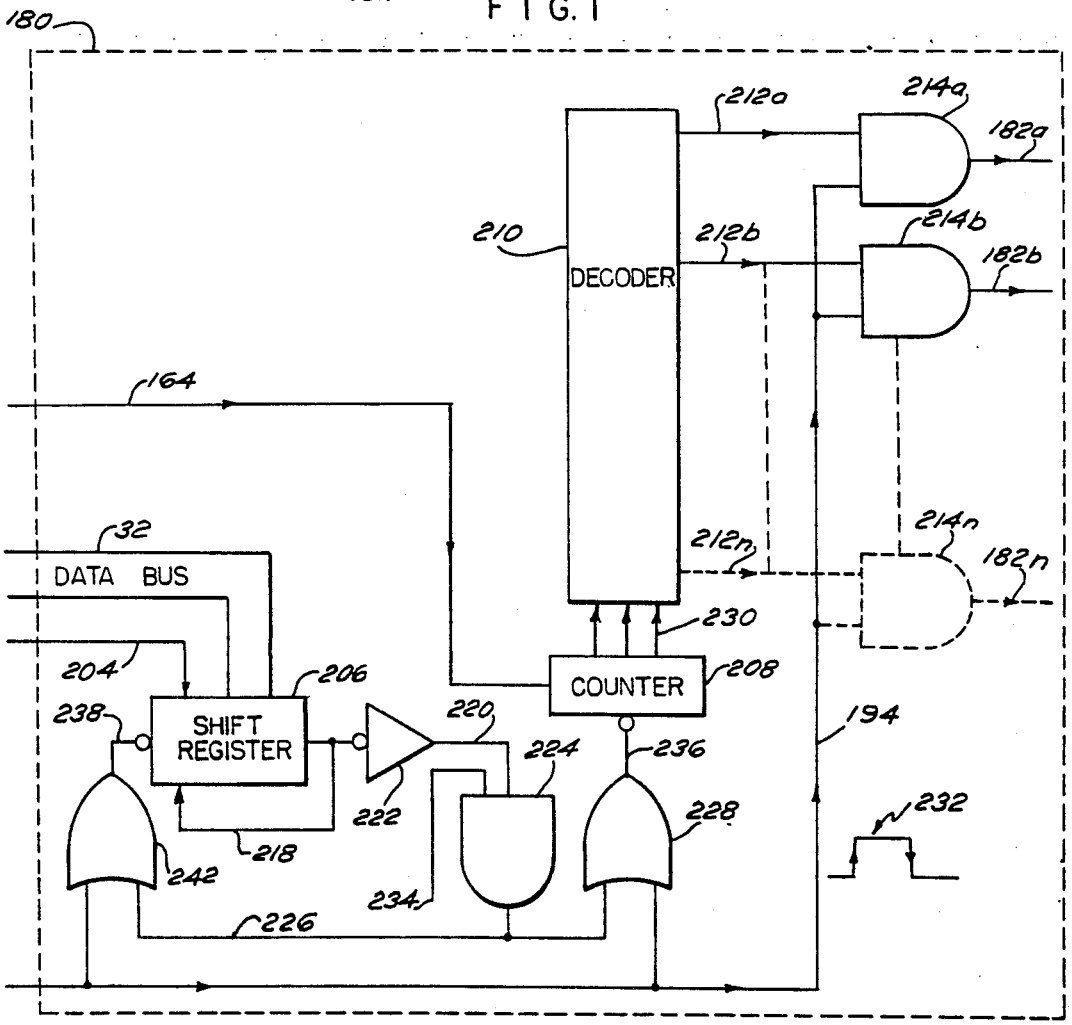
FIG. 5 is a schematic-block diagram of the address sequencer of FIG. 3A.

Refer additionally now to FIG. 5. FIG. 5 is a detailed diagram of address sequencer 180 of FIG. 2.

The eight bit word "00000101" is loaded into shift register 206 from data bus 32 by means of select line 204 from address decoder 172. Counter 208 is reset to a zero count upon power up from a reset pulse on line 164. Decoder 210 outputs a logic HIGH on line 212*a* and all other output lines 212*b–n* from decoder 210 are at logic LOW. This condition enables AND gate 214*a* and disables AND gates 214*b–n*. Output lines 182*b–n* are a logic LOW.

Shift register 206 contains the eight bit pattern "00000101" and the output line 218 from shift register 206 contains the right most bit of the eight bit sequence (a logic HIGH). Since line 218 is a logic HIGH, output line 220 from inverter 222 is LOW, disabling AND gate 224. Clock line 234 is the microprocessor system clock. This clock signal can only pass through AND gate 224 when line 218 is at logic LOW.

Counter 208 has been reset and its output lines 230 are all set to a logic LOW. Address select line 194 from address decoder 178 is used to write to UART's 28*a–n* and when this select line is activated, a pulse 232 is sent along line 194. This signal clocks a pulse out of line 182*a* which writes or loads UART 28*a* with the first byte of incoming data from UART 24 (FIG. 2). This pulse also moves or shifts the contents of shift register 206 one place to the right, which places the second telephone line's identification bit (a logic LOW) at output 218. Output line 218 from shift register 206 is fed to the input of shift register 206 and, whenever a pulse appears on line 238, the contents of the shift register are moved or shifted one place to the right. The right most bit replaces the left most bit, the left most bit moves one place to the right, etc.

Pulse 232, in addition to loading the first available UART 28*a*, also drives OR gate 228. The output 236 from OR gate 228 clocks counter 208 to the next state (001) which sets output line 212*a* from decoder 210 to a logic LOW. This condition also sets line 212*b* to logic HIGH. Since output line 218 from shift register 206 is a logic LOW, output line 220 from inverter 222 is at a logic HIGH, and clock signal 234 is able to pass through AND gate 224. The output on line 226 from AND gate 224 is fed to OR gate 228. Select line 194 is now at a logic LOW, which enables OR gate 228. The clock pulse on line 234 therefore appears at line 236 which increments counter 208 to the next state (010). The clock pulse on line 226 also passes through OR gate 242 to line 238 which shifts contents of shift register 206 one more space to the right. The third telephone line ID bit now appears at output line 218 (logic HIGH). Since this line is now HIGH, a clock pulse on line 234 cannot pass through AND gate 224 and increment counter 208. The next output line in the 212*a–n* sequence from decoder 210 is now at a logic HIGH. When select line 194 sends pulse 232, telephone line 16*c's* UART (not shown) is now selected or loaded with data from UART 24 (FIG. 3). When pulse 232 goes to a logic LOW, counter 208 is incremented to state "100" and shift register 206 shifts one place to the right. Output line 218 is now at a logic LOW and a clock pulse on line 234 increments counter 208 and moves shift register 206 one more place to the right. This process continues until the logic HIGH is encountered at the output of shift register 206.

Whenever one or all of UART's 28*a–n* receive serial data from answering computer 12B and modems 62*a–n*, their respective interrupt request lines 48*a–n* will signal through OR gate 168 and OR gate output line 170 to microprocessor 26 that an interrupt condition exists and that the UART receive data registers are full. Similarly, whenever UART 24 receives serial data over receive line 20 and when its receive data register is full, it too will signal microprocessor 26 that an interrupt condition exists. The flow chart shown in FIG. 5 depicts the sequence of events that is pre-programmed in ROM 60 that microprocessor 26 takes whenever an interrupt condition is acknowledged. Incoming serial data from answering computer 12B over telephone lines 16*a–n* is passed through DAA's 66*a–n* to its respective modem IC. The modem IC demodulates this analog data and loads its respective UART through the UART's serial receive data line. Once loaded with data, the UART's receive data register is full and the UART signals to microprocessor 26 through OR gate 168 that an interrupt condition exists. Microprocessor 2 begins sequencing through the instructions shown in FIG. 4 and alternately reads the contents of the UART's receive data registers.

Output lines 186*a–n* from address decoder 172 provide a selection for UART 28*a–n* only. These lines are passed through OR gate and select circuitry represented by OR gates 190*a–n* and the outputs 36*a–n* are sent to UART's 28*a–n* chip/register select. Selection of individual UART's is required when multiline modems 10*a* and 10*b* are in the command mode, i.e., receiving commands in "AT" type format from their respective computers. Selection of individual UART's is also required whenever microprocessor 26 is reading the status or receive data registers of UART's 28*a–n* and when writing initialization parameters into control registers. As shown in FIG. 4, whenever one of UART's 28*a–n* signals to microprocessor 26 through one of interrupt lines 48*a–n* that its receive data register is full, microprocessor 26 reads the status and data registers of these UART's and transfers the contents of the receive data registers to UART 24. Address sequencer 180, on the other hand, is utilized to write or transfer the contents of UART 24 to the next one of UART's 28*a–n* in sequence. Address sequencer 180 is sequenced, (i.e., incremented) whenever microprocessor 26 issues a write command that selectively addresses select line 194. Utilizing an internal or hardware address sequencer frees microprocessor 26 from tagging incoming data from UART 24 to a particular UART 28*a–n*.

Ring output indicator lines 70*a–n* from DAA's 66*a–n* signal the presence of a standard ring (20 Hz) signal on telephone lines 16*a–n*. These ring output indicator lines 70*a–n* are logically ORed using gate 250. The output signal of OR gate 250 is sent on line 252 to an interrupt line input on microprocessor 26. When multiline modem 10 is in the answer mode, presence of a ring output indicator signal on one of lines 70*a–n* interrupts microprocessor 26. Modems 62*a–n* are designed to output an answer or carrier frequency whenever a ring signal is sensed. This answer tone or carrier connects the answering modem 10B with originating modem 10A.

The prior description of the preferred embodiment connects to a business type telephone network 15 employing a plurality of telephone lines. The invention is capable of other embodiments and of being practiced or carried out in a variety of ways. For example, originating multiline modem 10*a* could connect to a single telephone line while answering multiline modem 10*b* could connect to a business telephone network with a plurality of telephone lines. When the initialization and connect sequence stored in ROM 60 occurs, originating modem 10*a* would indicate that it has only one line available while answering modem 10*b* would indicate its number of available lines. Since both modems 10*a* and 10*b* always revert to the maximum number of lines, modem 10*b* would adjust its ID word to indicate only one line is available. In this situation, both modems 10*a* and 10*b* would function as standard single line modems. Other embodiments are possible. For example, both modems 10*a* and 10*b* could connect to single line telephone systems and operate at the rate of a prior art modem. Additionally, the invention is not limited to standard copper wire type transmission systems. As long as a standard telephone interface is provided, alternate transmission media, such as fiber optics, can be utilized.

There has therefore been described a high throughput data communications system in which by determining the number of available telephone lines at both the originating and answering stations, an automatic adjustment to that number occurs so that the maximum number of lines are utilized at both locations. By utilizing this information and through the use of time separating over a plurality of telephone lines, data can be sent and/or received at a much more rapid rate than can be done using single telephone lines. Numerical displays indicate the maximum number of lines available and off-the-shelf telecommunications software can be used.

The system can be connected to conventional personal computers (PC's) using industry standard command sets and software telecommunication packages. The design of the multiline modem system is structured so as to be transparent to present telecommunications software. Multiline access is accomplished internal to the modem system using microcoded redial commands. A new and innovative system for determining the available ("on-hook") telephone lines at both the originating and answering end is utilized. Both the originating and answering modems communicate this information to each other and utilize the maximum number of available lines at both locations. Carrier detect or "connect" indication is held in abeyance until all available lines are seized and connected. The personal computer operator views only one "connect" indicator and can then begin on-line communications. Data passes from the transmitting computer's serial output port at a high data rate to the multiline modem system where it is separated and transmitted over a plurality of telephone lines. Since business type multiline telephones utilize a "circle" type of dialing structure, only one telephone number need be entered by the computer operator. This number is dialed by the originating modem in the multiline modem system. When a carrier detect is noted, it is placed in a hold state, and the same telephone number is then internally re-dialed using the second available telephone line at the originating end. Since the receiving telephone's first line has been seized and is now "busy," the receiving telephone system will jump to its next available line where the second modem IC in the originating multiline modem would initiate a second connect sequence. When the maximum number of lines are connected, a carrier detect or "connect" indication is passed to the originating computer's serial port. Both the originating and answering modems are now on-line and can commence data transmission.

It will be understood that many additional changes in the details, materials, steps, and arrangement of parts, which have been herein described and illustrated in order to explain the nature of the invention, may be made by those skilled in the art within the principle and scope of the invention as expressed in the appended claims.

What is claimed is:

1. A selecting system for selecting particular first telephone lines in an arrangement having a plurality of first and second telephone lines wherein said first telephone lines are serially connected to a respective member of said second plurality of telephone lines comprising:

interface means connected to said first plurality of telephone lines for generating a signal representative of the on/off hook status of said first plurality of telephone lines;

digitizing means connected to said interface means for generating a first word representative of the on/off hook status of said first plurality of telephone lines;

communications means connected to said interface means for transmitting said first word over the first of said available first plurality of telephone lines, said communications means further comprising reception means for receiving a second word over the first of said available first plurality of telephone lines representative of the number of available second plurality of telephone lines;

comparison means for comparing said first and second words;

modifying means for modifying said first word to produce a new first word representative of the maximum number of telephone lines available at both said first and second plurality of telephone lines; and selection means for selecting said particular first telephone lines having a quantity equal to said maximum number of telephone lines available at both said first and second plurality of telephone lines.

2. A selecting system for selecting particular first telephone lines in an arrangement having a plurality of first and second telephone lines according to claim 1 wherein said selection means further comprises:

dialing means for dialing a telephone number over the first of said first plurality of telephone lines.

3. A selecting system for selecting particular first telephone lines in an arrangement having a plurality of first and second telephone lines according to claim 2 wherein said selection means further comprises:

signal means for indicating a connection to transmit and receive using said first plurality of telephone lines representative of said new first word.

4. A selecting system for selecting particular first telephone lines in an arrangement having a plurality of first and second telephone lines according to claim 3 wherein said selection means further comprises:

re-dialing means for re-dialing said telephone number when said new first word indicates another available telephone line; and indication means for indicating that the number of telephone lines represented by said new first word are connected for transmitting and receiving purposes.

5. A selecting system for selecting particular first telephone lines in an arrangement having a plurality of first and second telephone lines according to claim 4 wherein said selection means further comprises:

numerical display means for displaying the maximum number of available telephone lines.

6. A selecting system for selecting particular first and second telephone lines in an arrangement having a plurality of first and second telephone lines wherein said first telephone lines are serially connected to a respective member of said second plurality of telephone lines comprising:

first sensing means for selecting first particular lines having a quantity equal to the maximum number of telephone lines available at both said first and second plurality of telephone lines;

said first sensing means includes first signal means connected to said first plurality of telephone lines for generating a first signal representative of the on/off hook status of said first plurality of telephone lines;

second sensing means for selecting second particular lines having a quantity equal to the maximum number of telephone lines available at both said first and second plurality of telephone lines; and said second sensing means includes second signal means connected to said second plurality of telephone lines for generating a second signal representative of the on/off hook status of said second plurality of telephone lines.

7. A selecting system for selecting particular first and second telephone lines in an arrangement having a plurality of first and second telephone lines according to claim 6 further comprising:

said first sensing means includes first computation means for determining the number of available first plurality of telephone lines, and first digitizing means for generating a first word representative of the number of said available first plurality of telephone lines; and said second sensing means includes second computation means for determining the number of available second plurality of telephone lines, and second digitizing means for generating a second word representative of the number of said available second plurality of telephone lines.

8. A selecting system for selecting particular first and second telephone lines in an arrangement having a plurality of first and second telephone lines according to claim 7 further comprising:

said first sensing means further includes first dialing means for dialing a telephone number over the first of said first plurality of telephone lines, and first transmit means for transmitting said first word over the first of said available first plurality of telephone lines, said second sensing means further includes second dialing means for dialing a telephone number over the first of said second plurality of telephone lines, and second transmit means for transmitting said second word over the first of said available second plurality of telephone lines, said first sensing means further includes first reception means for receiving said second word over the first of said available first plurality of telephone lines, said second word being representative of the number of available second plurality of telephone lines, and first comparison means for comparing said first and second words;

said second sensing means further includes second reception means for receiving said first word over the first of said available second plurality of telephone lines, said first word being representative of the number of available first plurality of telephone lines, and second comparison means for comparing said second and first words;

said first sensing means further comprises first modifying means for modifying said first word to produce a new first word representative of the maximum number of telephone lines available at both said first and second plurality of telephone lines; and said second sensing means further comprises second modifying means for modifying said second word to produce a new second word representative of the maximum number of telephone lines available at both said second and first plurality of telephone lines.

9. A selecting system for selecting particular first and second telephone lines in an arrangement having a plurality of first and second telephone lines according to claim 8 further comprising:

signal means for indicating a connection to transmit and receive using the number of said first and second plurality of telephone lines representative of said new first word and new second word, respectively.

10. A selecting system for selecting particular first and second telephone lines in an arrangement having a plurality of first and second telephone lines according to claim 9 further comprising:

first re-dialing means for re-dialing said telephone number when said new first word indicates another available telephone line;

first indication means for indicating that the number of telephone lines represented by said new first word are connected for transmitting and receiving purposes;

second re-dialing means for re-dialing said telephone number when said new second word indicates another available telephone line; and second indication means for indicating that the number of telephone lines represented by said new second word are connected for transmitting and receiving purposes.

11. A selecting system for selecting particular first and second telephone lines in an arrangement having a plurality of first and second telephone lines according to claim 10 further comprising:

numerical display means for displaying the maximum number of available telephone lines.

* * * * *